Jan. 5, 1926.  1,568,731
M. C. GRIFFIN ET AL
SHAFT BEARING
Filed Feb. 19, 1924
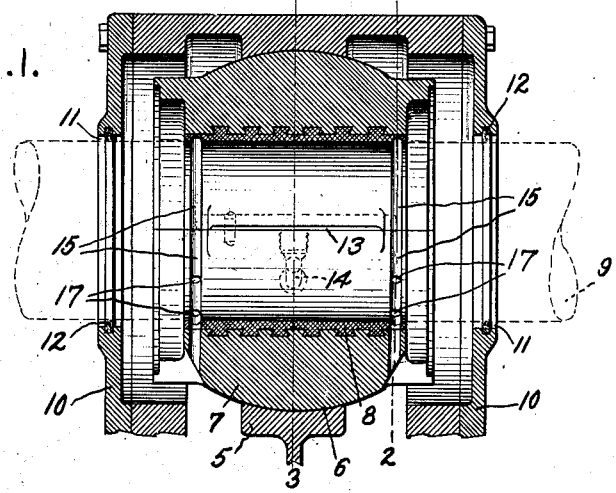
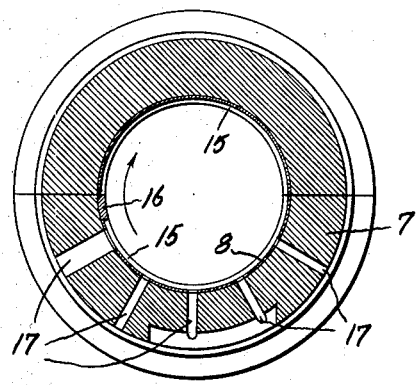
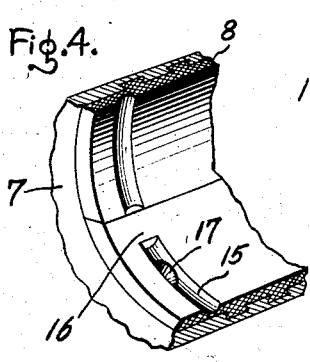
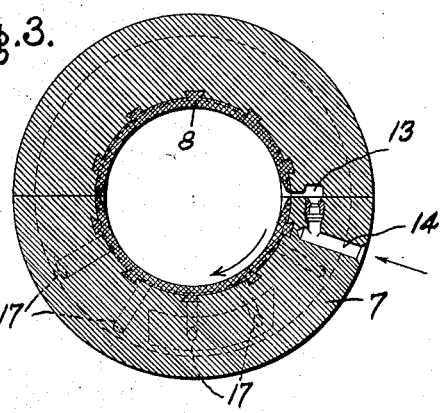
Inventors:
Marvin C. Griffin,
Dwight L. Berkey,
by Alexander S. Lewis
Their Attorney.

Patented Jan. 5, 1926.

1,568,731

UNITED STATES PATENT OFFICE.

MARVIN C. GRIFFIN, OF LYNN, MASSACHUSETTS, AND DWIGHT L. BERKEY, OF PHILADELPHIA, PENNSYLVANIA, ASSIGNORS TO GENERAL ELECTRIC COMPANY, A CORPORATION OF NEW YORK.

SHAFT BEARING.

Application filed February 19, 1924. Serial No. 693,893.

*To all whom it may concern:*

Be it known that we, MARVIN C. GRIFFIN and DWIGHT L. BERKEY, citizens of the United States, residing respectively at Lynn, in the county of Essex, State of Massachusetts, and at Philadelphia, in the county of Philadelphia, State of Pennsylvania, have invented certain new and useful Improvements in Shaft Bearings, of which the following is a specification.

The present invention relates to shaft bearings and more particularly to shaft bearings for machines of considerable size such as elastic fluid turbines, for example, wherein the bearing pressure may be considerable and wherein lubricant is passed through the bearings both for lubricating purposes and for cooling the bearings. With such bearings the lubricant is usually supplied under pressure and is passed through them in comparatively large quantities. For example, in moderate sized bearings five gallons of lubricant per minute may be fed through a bearing while in the case of a larger bearing as much as forty gallons per minute may be fed through it.

In connection with such bearings, there is a tendency for lubricant to escape from the ends of the bearings and be thrown from the shaft by centrifugal force, causing what is usually termed "oil throwing". This is very objectionable and various arrangements have been devised to prevent it.

The object of our present invention is to provide an improved arrangement for preventing the escape of lubricant from the ends of a bearing, i. e. "oil throwing", and for a consideration of what we believe to be novel and our invention, attention is directed to the accompanying description and the claims appended thereto.

In the drawing, Fig. 1 is a vertical sectional view of a bearing embodying our invention; Fig. 2 is a sectional view taken on line 2—2, Fig. 1; Fig. 3 is a sectional view taken on line 3—3, Fig. 1, and Fig. 4 is a detail perspective view looking toward the inside of a portion of the bearing lining.

Referring to the drawing, 5 indicates a bearing pedestal or support having a spherical seat 6 upon which is mounted the pillow block 7. The pillow block is split horizontally to form upper and lower halves and is provided with a bearing lining 8 of suitable bearing material upon which the shaft 9 indicated in dotted lines in Fig. 1, runs. The direction of rotation of the shaft is indicated by the arrow in Fig. 2. The end walls of the bearing housing are indicated at 10. They are provided with openings 11 through which the shaft projects and in the walls of which are packing rings 12 which pack against the shaft. Lubricant is fed to the bearing by a channel 13 to which lubricant is supplied from any suitable source through a conduit 14. As shown in Fig. 1, channel 13 extends substantially the full width of the bearing.

The bearing structure as just described may be taken as typical of bearing structures in general.

According to our invention, we provide in the bearing lining at each end of the bearing an annular groove 15 and in each groove on the side of the bearing at which the movement of the shaft is upward we place a dam 16. Below these dams we provide drain openings or holes 17 which communicate with grooves 15 and serve to drain lubricant from the grooves, the lubricant flowing from the drain holes into a suitable reservoir (not shown) from which it can be withdrawn and again used. Dams 16 are preferably located in the portions of the grooves in the lower bearing halves and just below the horizontal joint between the two halves. Drain holes 17 also are preferably all located in the lower half of the bearing.

By this arrangement, we have found that the lubricant in flowing through the bearing will be caught in grooves 15 and discharged from the bearings through drain openings 17, none of the lubricant escaping to the outside of the bearing. This, we believe, is due to the fact that the dams 16 prevent the oil which flows into grooves 15 from being pumped continuously around the bearing by the pumping action of the rotating shaft. Such oil as flows to the lower halves of the grooves 15 will readily escape through opening 17 as this offers the path of escape of least resistance while such oil as flows to the upper halves of the grooves 15 will be pumped around by the shaft to the lower halves of the grooves and will escape through openings 17. Because of dams 16, which are placed in the grooves on the side of the shaft at which rotation is upward, oil from the lower halves of the grooves cannot be pumped on up into the upper halves of the grooves so that all the oil the upper halves of the grooves are required to handle is that which flows to them from the bearing. This amount is readily taken care of by the pumping action of the shaft.

In this connection it is pointed out that a shaft rests on the bottom of a bearing and that over the top of the bearing there is always clearance between the bearing lining and the shaft. It is from this clearance space primarily that the oil leakage tends to take place, the oil leaking out on to the shaft and being thrown off by centrifugal force. We have found that when dams 16 are omitted from grooves 15 oil leakage occurs and this we now believe to be due to the fact that the shaft pumps oil from the lower halves of the grooves up into the upper halves in such quantities as to more than fill the grooves, thereby building up pressure in such upper halves with the result that oil leaks out of the bearing. With dams in the grooves, however, oil cannot carry up from the lower halves of the grooves to the upper halves and as a result, the pumping action of the shaft actually produces a suction in the upper halves of the grooves which results in pumping the oil from the upper halves of the grooves to the lower halves where it escapes through openings 17.

We have found that considerable oil is carried around in grooves 15 to a point directly adjacent to the underside of dams 16 and for this reason we make the openings 17 which are directly adjacent to the dams of larger size than the other openings so as to provide for the ready escape of the oil.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. A shaft bearing provided with an annular groove in its inner face at one or each of its ends, a dam in each groove, and one or more discharge passages communicating with each groove.

2. A shaft bearing provided with an annular groove in its inner face at one or each of its ends, a dam in each groove on the side of the bearing at which the rotation of the shaft is upward, and one or more discharge passages communicating with each groove in advance of the dam as regards the direction of rotation of the shaft.

3. A shaft bearing provided with a groove in its inner face at one or each of its ends, which extends from a point on the side of the bearing at which rotation of the shaft is upward to a point beyond the opposite side of the bearing, terminating short of the point at which it begins whereby the groove is not continuous, and one or more discharge passages communicating with each groove.

In witness whereof, the said MARVIN C. GRIFFIN has hereunto set his hand this 8th day of February, 1924, and the said DWIGHT L. BERKEY has hereunto set his hand this 11th day of February, 1924.

MARVIN C. GRIFFIN.
DWIGHT L. BERKEY.